United States Patent [19]

Leupold

[11] Patent Number: 5,063,004

[45] Date of Patent: Nov. 5, 1991

[54] FABRICATION OF PERMANENT MAGNET TOROIDAL RINGS

[75] Inventor: Herbert A. Leupold, Eatontown, N.J.

[73] Assignee: The United States of America as represented by the Secretary of the Army, Washington, D.C.

[21] Appl. No.: 431,278

[22] Filed: Nov. 3, 1989

Related U.S. Application Data

[62] Division of Ser. No. 302,706, Jan. 26, 1989, Pat. No. 4,911,627.

[51] Int. Cl.[5] .............................................. B29C 35/02

[52] U.S. Cl. ...................................... 264/22; 264/219; 264/328.3; 264/DIG. 58

[58] Field of Search ...................... 264/22, 219, 328.3, 264/DIG. 58

[56] References Cited

U.S. PATENT DOCUMENTS 4,678,616 7/1987 Kawashima .......................... 264/24

OTHER PUBLICATIONS

Leupold, "Impact of the High Energy . . . Circuit Design," *Mat. Res. Soc. Symp Proc.* (1987).

*Primary Examiner*—James Lowe
*Assistant Examiner*—Christopher A. Fiorilla
*Attorney, Agent, or Firm*—Michael Zelenka; John M. O'Meara

[57] ABSTRACT

A hollow cylindrical flux source (HCFS) is formed into a toroidal shape. A hollow toroidal of magnetically neutral material is mounted in the central cavity of the toroidal flux source. The hollow toroidal has a central coaxial toroidal cavity of given cross-section (e.g., rectangular). The toroid flux source and the hollow toroid are each equatorially split into two halves. When the two halves are brought into juxtaposition and a suspension of magnetic material is deposited in the coaxial toroidal cavity a permanent magnet toroidal ring will be fabricated.

5 Claims, 2 Drawing Sheets

FABRICATION OF PERMANENT MAGNET TOROIDAL RINGS

The invention described herein may be manufactured, used, and licensed by or for the Government for governmental purposes without the payment to me of any royalties thereon.

This application is a division of application Ser. No. 302,706, filed 01/26/89 now U.S. Pat. No. 4,911,627.

TECHNICAL FIELD

The present invention relates to a method for making permanent magnet toroidal rings.

BACKGROUND OF THE INVENTION

Both electromagnets and permanent magnets have been used to manipulate beams of charged particles. In traveling wave tubes, for example, magnets have been arranged around the channel through which the beam travels to focus the stream of electrons; that is, to reduce the tendency of the electrons to repel each other and spread out. Various configurations of permanent magnets (and pole pieces) have been tried in an attempt to increase the focusing effect while minimizing the weight and volume of the resulting device. In conventional traveling wave tubes, permanent magnets are often arranged in a sequence of alternating magnetization, either parallel to, or anti-parallel to, the direction of the electron flow. These axially magnetized, permanent magnets are usually annular or toroidal in shape and their axes are aligned with the path of the electron beam. The patent to Clarke, U.S. Pat. No. 4,731,598, issued Mar. 15, 1988, illustrates typical prior art, periodic permanent magnet (PPM) structures.

An axially magnetized toroidal ring is typically made by subjecting a ring of magnetic material to an intense magnetic field using a very large electromagnetic source. To provide an intense magnetic field (e.g., 13 $kO_e$) for this purpose the electromagnetic source is, of necessity, large (several hundred pounds), cumbersome, and requires high input power.

There are instances and/or applications where radially magnetized toroidal rings are desirable. Heretofore, the making of radially magnetized toroids was difficult and time consuming. Typically, a plurality of toroid sections were magnetized piece-by-piece and the magnetized sections then assembled to form a radially magnetized toroidal ring. But, unfortunately, this laborious technique still provides only an approximation to a true radial field. In a true radial magnetic field the direction of magnetization changes continuously around the toroidal circle. However, with a sectioned toroid, significant field discontinuities occur from section to section.

There are also some limited situations which call for a toroidal ring with a field direction at some selected angle with respect to the toroid axis. For example, ring-shaped bucking corner magnets mounted on the ends of a cylindrical primary magnet usually require a field direction 45° with respect to the axis of the primary magnet. However, to magnetize a toroidal ring at some arbitrary angle with respect to the toroid axis is done only with great difficulty and only in the described section-by-section manner. Besides fabrication difficulties, the field discontinuities encountered have proved troublesome.

SUMMARY OF THE INVENTION

A primary object of the present invention is to facilitate the making of permanent magnet toroidal rings.

It is a related object of the invention to provide an improved technique for the fabrication of toroidal rings having axial, radial, or arbitrary angled, magnet fields.

A further object of the invention is to provide a method for making toroidal rings of any desired magnetization direction and to do so in a simple and economical manner.

The present invention makes advantageous use of the "magic ring" disclosed, for example, in the article "Impact of the High-Energy Product Materials on Magnetic Circuit Design" by H.A. Leupold et al., Materials Research Society Symposium, Proc. Vol. 96 (1987), pp 279–306, esp. 297. The magic ring is a hollow cylindrical flux source (HCFS); that is, it is a cylindrical permanent-magnet shell which offers an interior magnetization vector that is more-or-less constant in magnitude and produces a field greater than the remanence of the magnetic material from which it is made.

In accordance with the present invention, a magic ring is "bent" into a toroidal shape to form a magic torus. Depending upon how the magic ring is formed into the toroid shape, an interior axial, radial, or arbitrarily angled, magnetic field can be provided. The magic torus is cut through its major equator to provide two halves of a toroidal magnetizing fixture. The two halves are mounted in a pair of die plates or supports. A hollow toroid made of magnetically neutral material (e.g., brass, stainless steel, ceramic, etc.) is split in half and each half of the same is closely fitted into a half of the magic torus. A coaxial toroidal cavity of predetermined cross-section (e.g., rectangular) is defined by the juxtaposed halves of the toroid of magnetically neutral material. An injection port extends from the toroidal cavity to the outer periphery of the magic torus.

BRIEF DESCRIPTION OF THE DRAWINGS

The invention will be more fully appreciated from the following detailed description when the same is considered in connection with the accompanying drawings in which.

DETAILED DESCRIPTION

Figure 1:
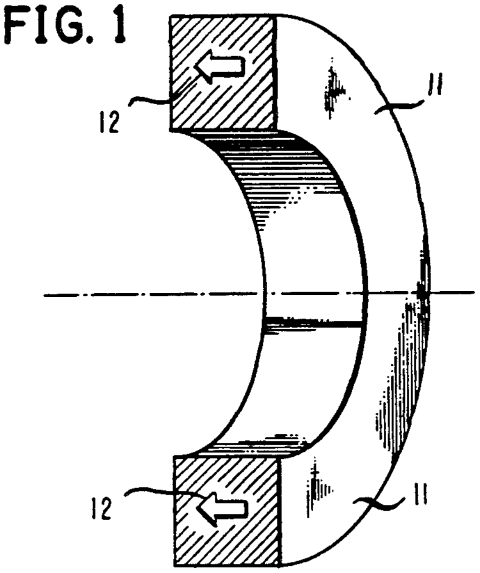
FIG. 1 is an enlarged perspective view of a half a toroidal ring which can be fabricated in accordance with the present invention.

FIG. 1 illustrates a permanent magnet toroidal ring 11 which can be readily fabricated in accordance with the principles of the present invention. For illustrative purposes, only half of the toroidal ring is shown in FIG. 1. As indicated by the arrows 12, the toroidal ring is axially magnetized. This direction of magnetization is commonly utilized in periodic permanent magnet (PPM) stacks used in traveling wave tubes; see FIG. 2 of the above-cited patent to Clarke. The ring magnet 11 may be comprised of any of the known magnetic materials; at this time, the "rare earth" materials (e.g., a commercial $Sm_2TM_{17}$ magnet material) are commonly used.

Figure 2:
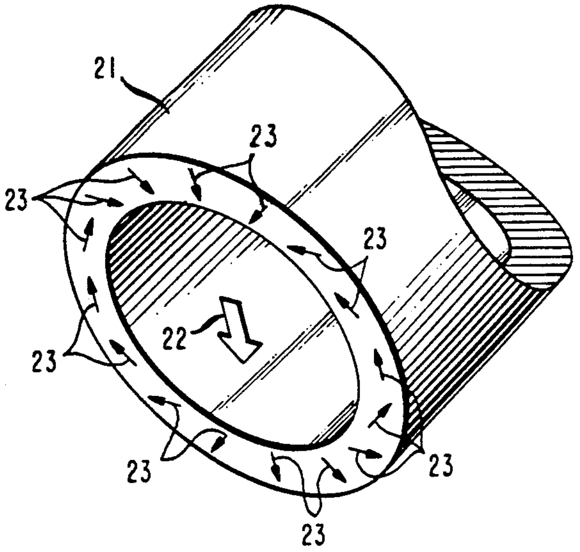
FIG. 2 is an abbreviated showing of an ideal magic ring.

FIG. 2 illustrates a hollow cylindrical flux source 21 (HCFS), ofttimes called a "magic ring." A HCFS or magic ring is a cylindrical permanent-magnet shell which offers a magnetization vector that is substantially constant in magnitude and produces a field greater than the remanence of the magnetic material from which it is made. The large arrow 22 designates the substantially uniform high-field in the central cavity. The small arrows 23 indicate the magnetization orientation of various points in the magnetic shell. As is evident, the magnetization direction 23 changes continuously as the angular coordinate changes; this is discussed in greater detail in the above-cited article by Leupold et al.

FIG. 2 illustrates an ideal HCFS. However, since it is not feasible to construct an ideal HCFS, in practice a segmented approximation is resorted to. In such a configuration the magnetization is constant in both magnitude and direction within any one segment. Fortunately, even with as few as eight segments, more than 90 percent of the field of the ideal structure is obtainable. In fact, an octagonal approximation to the ideal magic ring appears suitable for almost all applications; again, see the aforementioned article by Leupold et al. for a disclosure of the segmented and octagonal approximations to an ideal HCFS.

Figure 3:
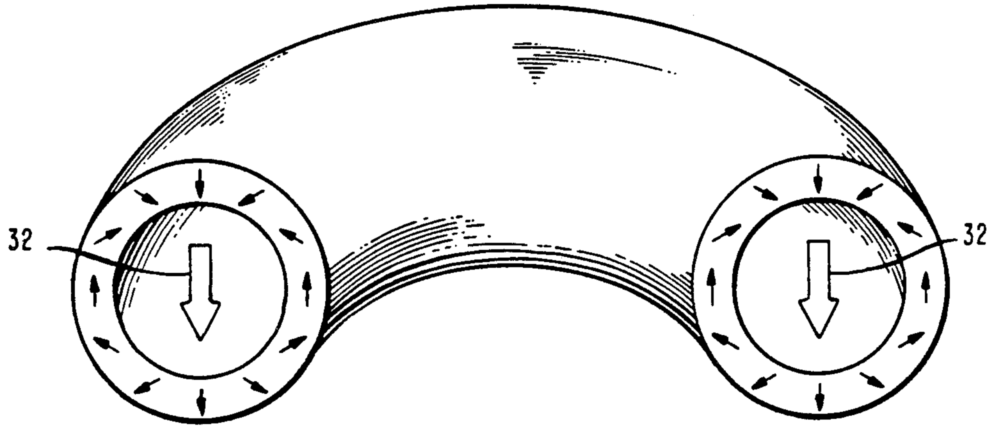
FIG. 3 is a perspective view of one-half of an axial magic torus which may be utilized to accomplish the invention.

Now if a given length of a cylindrical magic ring, such as illustrated in FIG. 2, is "bent" into a toroidal shape so that one end interfaces the other a "magic torus" results. Such a torus is shown in FIG. 3, where for illustrative purposes only half of the magic torus is shown. Given the central cavity field direction shown in FIG. 2, it will be evident that if a given length of the FIG. 2 magic ring is bent in the horizontal plane the torus illustrated in FIG. 3 will result. As illustrated by the large arrows 32 in FIG. 3, the magnetic field in the cavity of the resultant magic torus is oriented in the axial direction; i.e., parallel to the torus' axis. And, magnet material placed in the central cavity of the magic torus will be magnetized by the field of the torus in the same direction (axially). Thus, the axial magic torus of FIG. 3 can be utilized to fabricate toroidal rings having axial magnetization vectors. As with FIG. 2, an approximation (e.g., an octagonal cross-section) to an ideal magic torus can, in practice, be resorted to.

Figure 4:
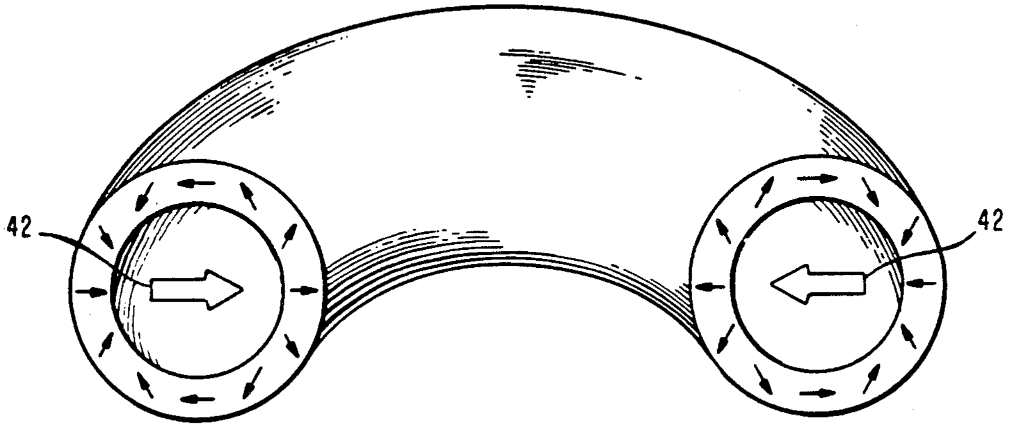
FIG. 4 is a perspective view of one-half of a radial magic torus which may be utilized to accomplished the invention.

If a length of the magic ring of FIG. 2 is bent into a toroid in the vertical plane the radial magic torus illustrated in FIG. 4 results. Thus, the field 22 of FIG. 2 becomes the radial field 42 in the FIG. 4 magic torus. This perhaps can be more readily appreciated if the torus of FIG. 4 is viewed vertically. The radial magic torus of FIG. 4 can be readily utilized to fabricate toroidal rings having radially directed magnetic fields. And, once again, an approximation to an ideal radial magic torus can, in practice, be resorted to without consequence.

If a selected length of the magic ring of FIG. 2 is bent into a toroid at an angle with respect to the vertical/horizontal planes, then the field direction in the torus' central cavity will be at an angle (e.g., 45°) with respect say to the axis of the resultant torus. That is, the central cavity field direction will be at some angle with respect to the axial and/or radial directions. Accordingly, such a magic torus can be used to readily fabricate a toroidal ring having a desired, arbitrarily angled; magnetization. The term "bent" is used figuratively herein and only for illustrative purposes. In practice, a magic torus would be fabricated in a manner similar to that disclosed in applicant's co-pending application, Ser. No. 215,094, filed July 5, 1988. Once made, a magic torus can be used according to the invention in the fabrication of a multitude of permanent magnet toroidal rings.

Figure 5:
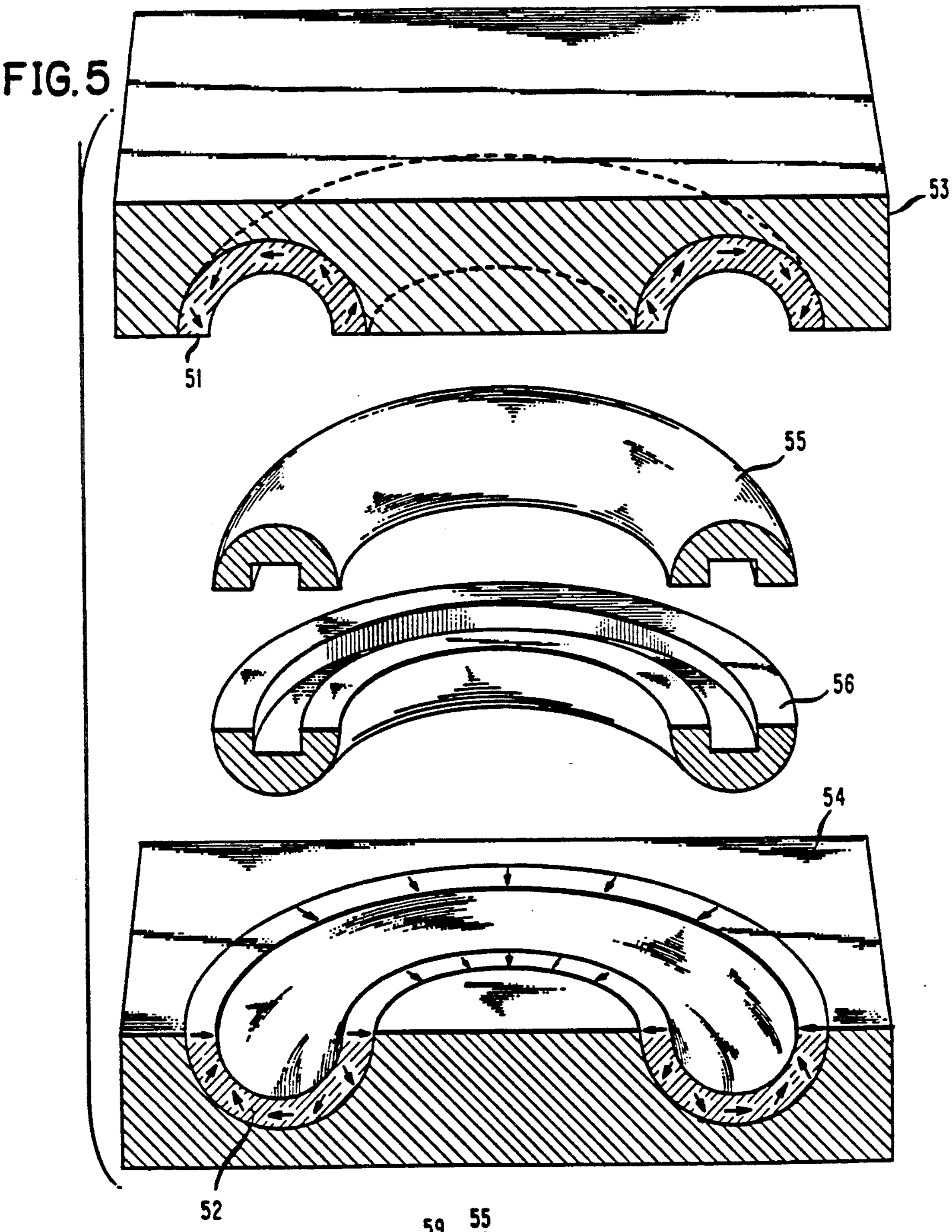
FIG. 5 is an exploded, perspective view of the apparatus utilized in making toroidal rings having axial, radial, or arbitrarily angled, magnet fields.
Figure 6:
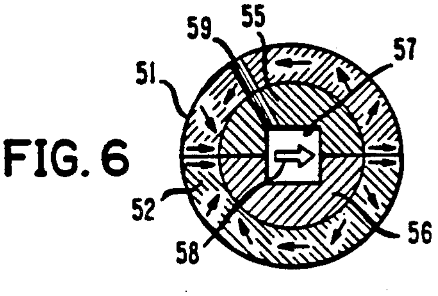
FIG. 6 is a cross-section view of the pertinent apparatus of FIG. 5 in assembled form.

A magic torus as previously described is cut or split along its major equator, as illustrated in FIG. 5, and each of the torus' halves 51, 52 is closely mounted in a plate-like support 53, 54. A hollow toroid made of magnetically neutral material, such as brass, stainless steel, ceramic, etc., is also split equatorially and each half of the same 55, 56 is closely and securely fitted into a half of the magic torus. When the toroidal magnetizing apparatus of FIG. 5 is assembled, as indicated in FIG. 6, the juxtaposed halves 55, 56 define a central toroidal cavity 57 of predetermine cross-section. The cavity 57 illustrated in FIG. 6 is rectangular in cross-section, but it will be evident that it could as readily be circular, triangular, hexagonal, etc. in cross-section. Thus, when (unmagnetized) magnetic material is deposited in the toroidal cavity 57, a radially magnetized toroidal ring will be formed, i.e., the intense radial magnetic field 58 of the magic torus, formed by halves 51, 52, serves to radially magnetize the magnetic material deposited in the toroidal cavity. And, since a magic torus providing an axial or arbitrarily angled interior magnetic field can be used as readily, it will be apparent to those in the art that the described apparatus can be utilized to make toroidal rings of any cross-section and of any magnetization field direction—i.e., axial, radial, or arbitrarily angled.

The toroidal rings fabricated in accordance with the invention may comprise $SmCo_5$ or a ferrite in powdered form or granulated and suspended in a bonding medium such as epoxy or SnPb solder powder binder. The composite suspension can be introduced into the toroidal cavity 57 via an injection port 59. Depending upon the material making up the suspension, the injection of the suspension may (or may not) be carried out at a somewhat elevated temperature. Alternatively, of course, a preformed toroidal ring of desired cross-section can be simply placed in the toroidal cavity 57 of corresponding cross-section and the assembled apparatus (i.e., the magic torus) will then quickly magnetize the ring with the desired magnetic field direction. The magic torus' in accordance with the invention can provide an internal or central cavity field of, at least, 13 kOe. Thus, the production of toroidal rings having a magnetization of 8–10 kG is readily attained. And, this magnitude of magnetization is more than sufficient for substantially any and all applications, such as traveling wave tubes, wigglers, and so on.

The magnetic material of the magic torus' may be comprised of $Nd_2Fe_{14}B$, $SmCo_5$, $Sm_2(CoT)_{17}$ where T is one of the transition metals, and so on. The foregoing materials are characterized by the fact that they maintain their full magnetization in fields larger than their coercivities. These and other equivalent magnetic materials (e.g., selected ferrites) are known to those in the art. The magnetic material of the toroidal rings, to be magnetized according to the invention, can also be made of any of the foregoing materials, as well as the older, prior art magnetic materials such as alnico, platinum cobalt, etc.

Typically, one of the foregoing magnetic materials in a powdered or particulated form is suspended in a commercially available binder (e.g., epoxy). The suspension is then introduced into the toroidal cavity 57 via the injection port 59, for example. The "setting" of the suspension and the magnetization operation take place together. After a given "setting" period, from several minutes to several hours depending upon the suspension vehicle used, a magnetized toroidal ring is available by simply separating the halves of the apparatus of the invention. It is to be understood at this point, that the principles of the present invention are in no way limited to the magnetic material(s) making up the toroidal rings or the manner of molding the same. These materials as well as various molding techniques are well known to those skilled in the art.

Having shown and described what is at present considered to be several preferred embodiments of the invention, it should be understood that the same has been shown by way of illustration and not limitation. And, all modifications, alterations and changes coming within the spirit and scope of the invention are herein meant to be included.

What is claimed is:

1. A method for fabricating a permanent magnet toroidal ring comprising the steps of forming a hollow cylindrical permanent magnet flux source into a toroidal shape, splitting the toroidal flux source into two halves through its major equator, mounting two halves of a hollow toroid of magnetically neutral material into the two halves of the toroidal flux source, placing the two halves of the toroidal flux source in juxtaposition, depositing an unmagnetized suspension of magnetic material into the cavity of the toroid of neutral material, allowing time for the magnetic material to set and be magnetized, separating the halves of the toroidal flux source, and removing the permanent magnet toroidal ring from within the toroid of neutral material.

2. A method as defined in claim 1 wherein said suspension is injected via an injection port into the cavity of the toroid of magnetically neutral material.

3. A method as defined in claim 1 wherein the magnetic flux source is formed into a toroidal shape so as to produce an axial magnetic field in its central cavity.

4. A method as defined in claim 1 wherein the magnetic flux source is formed into a toroidal shape so as to produce a radial magnetic field in its central cavity.

5. A method as defined in claim 1 wherein the magnetic flux source is formed into a toroidal shape so as to produce in its central cavity a magnetic field at a predetermined angle less than 90 with respect to the axis of the toroidal flux source.

* * * * *